United States Patent [19]

Benjamin et al.

[11] 4,168,837
[45] Sep. 25, 1979

[54] SHAFT SEAL WITH SCRAPER

[75] Inventors: Martin E. Benjamin; George Fedorovich, both of Gastonia; Dennis N. Denton, Gaston County, all of N.C.

[73] Assignee: Garlock Inc., Rochester, N.Y.

[21] Appl. No.: 784,540

[22] Filed: Apr. 4, 1977

[51] Int. Cl.² ............................................. F16J 15/56
[52] U.S. Cl. .................................. 277/24; 277/235 R
[58] Field of Search ...................... 277/24, 235 R, 153

[56] References Cited
U.S. PATENT DOCUMENTS

| | | | |
|---|---|---|---|
| 2,509,151 | 5/1950 | Kasten | 277/235 |
| 3,493,645 | 2/1970 | Sanderson et al. | 277/153 |

Primary Examiner—Robert I. Smith
Attorney, Agent, or Firm—Schovee & Boston

[57] ABSTRACT

An annular scraper and a shaft seal including a scraper and a method for making the same. The seal and scraper are of bonded construction. The seal includes an outer shell such as a stainless steel capsule, a polytetrafluoroethylene sealing element, a brass scraper, and a bonded elastomeric ring behind the scraper to allow deflection and return of the scraper. The scraper is preferably a single member having a continuous, uniform scraping edge without any slits. A bushing can be included for guiding a reciprocating shaft (a cable or rod) in near perfect alignment. The process preferably includes the step of forming the scraping edge by pinching or piercing a brass member in the mold simultaneously with the steps of molding the elastomeric ring and bonding the elastomeric ring to the scraper. The process of making the seal includes the step of simultaneously forming the ring of polytetrafluoroethylene into a sealing element. The piercing step eliminates the need for a separate piercing step and provides improved concentricity of the annular scraping edge.

24 Claims, 5 Drawing Figures

SHAFT SEAL WITH SCRAPER

BACKGROUND OF THE INVENTION

1. Field of the Invention

This invention relates to annular scrapers and to shaft seals using scrapers and also to methods for making the same.

2. Description of the Prior Art

Scrapers and seals with scrapers are known, however, such prior devices using a brass scraper were of the assembled type mechanically held together, such as by a turned edge of a shell, as contrasted to the bonded construction of the present seal. Further, such prior art brass scrapers had slits (or splits) therein to attempt to afford some degree of flexibility, and they required a plurality of such brass scrapers to overlap the slits. However, such slits did afford a path for contaminants to enter the application and the overlapping was not completely successful in eliminating such paths. In addition, in control cables such as used on large bulldozers and other similar equipment there is a certain amount of cable deflection and previous scrapers could not handle this amount of deflection but would be permanently deformed allowing foreign contaminants to pass into the application.

It is an object of the present invention to provide an improved scraper, seal and method for making the same which overcomes the problems in the prior art. It is a further object of the present invention to provide a scraper with a backup ring of resilient elastomeric material, which scraper can repeatedly resiliently accommodate the encountered amount of cable deflection and return to its original position without losing the scraping function. It is a still further object of the present invention to provide in combination with such a scraper a functional polytetrafluoroethylene sealing element with a sealing lip. It is another object of the invention to provide a scraper having a continuous, uniform scraping edge without the slits of the prior art. It is another object of this invention to provide a method for making a scraper, and a seal with a scraper, which eliminates a separate piercing step, which also provides improved concentricity of the scraping edge, which also provides a bonded construction, and which eliminates a leakage path around the outside of the scraper. It is still another object of this invention to provide a cable control type of seal with a scraper and a bushing which guides the shaft in near perfect alignment.

SUMMARY OF THE INVENTION

The present invention includes in one embodiment an annular shaft seal including a sealing element, a metal scraper, and a bonded resilient elastomeric ring. In a preferred embodiment the scraper has a continuous, uniform scraping edge. The sealing element is preferably a polytetrafluoroethylene sealing element mechanically held in place. A bushing can also be included by being press-fitted into an I.D. of a shell adjacent the sealing element and the scraper to provide true alignment of the shaft (the cable or rod, for example). The present invention also includes a method for making such a shaft seal in which the scraper is pierced during the molding step simultaneously with the molding of the elastomeric ring and the sealing element and bonding the ring to the scraper. Another embodiment of the invention is the combination of an annular scraper and an annular, resilient elastomeric back-up ring to provide flexibility for the scraper, and a method for making the same including piercing the scraper simultaneously with molding the elastomeric ring and bonding it to the scraper.

BRIEF DESCRIPTION OF THE DRAWING

The present invention will be more fully understood by reference to the following detailed description thereof, when read in conjunction with the attached drawing, wherein like reference numerals refer to like elements and wherein.

DETAILED DESCRIPTION OF THE PREFERRED EMBODIMENTS

Figure 1:
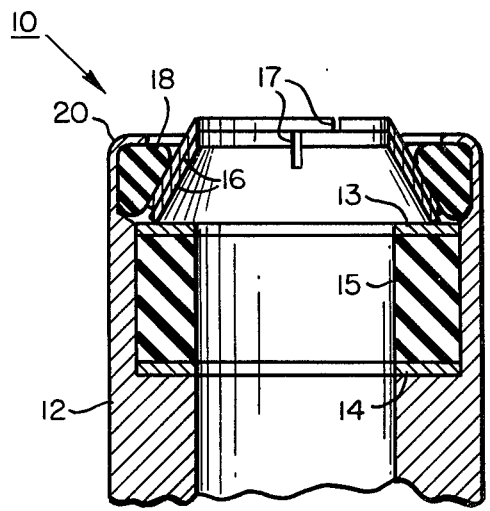
FIG. 1 is a partial cross-sectional view through a prior art cable scraper.

Referring now to the drawing, FIG. 1 shows a typical prior art cable scraper 10, used, for example, in conjunction with a seal for a hydraulic valve and including a shell 12, a pair of brass washers 13 and 14 on either side of a rubber washer 15, a pair of frustoconical brass scrapers 16 each having a plurality of slits 17 therein overlapped by the adjacent brass scraper, and a small, hard rubber ring 18 against which the distal end 20 of the shell is rolled over and crimped to hold the assembly together. Assembled seals of this type are not satisfactory in that, for example, in applications where they are used in bulldozers and similar large equipment in cold climates, the scrapers 10 allow ice, water, dirt and other contaminants into the assembly where such contaminants freeze rendering the equipment inoperative. Such contaminants enter through the slits 17 even when the scraper is properly against the shaft (not shown) and contaminants also enter when the scraper is deflected and deformed and fails to return to its original position against the shaft.

Figure 2:
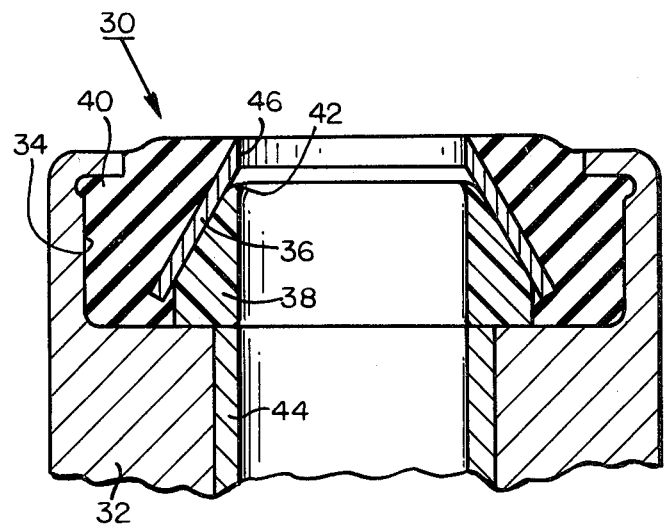
FIG. 2 is a partial cross-sectional view through a combination seal and scraper according to the preferred embodiment of the present invention.

FIG. 2 shows a seal 30 according to the present invention of bonded construction and comprising a shell 32 (preferably a stainless steel capsule) having a recess 34 in one end thereof, the single scraper 36 preferably of brass, a polytetrafluoroethylene sealing element 38 and an annular resilient elastomeric back-up ring 40 preferably of nitrile bonded to both the shell 32 and the scraper 36. It is noted that the sealing element 38 has a functional sealing lip 42 for sealing purposes. The seal 30 preferably also includes a bushing 44, such as a Garlock DU bearing, press-fitted into a cylindrical I.D. surface of the shell 32 adjacent the recess 34. The bushing 44 provides true alignment of the shaft (such as a cable or reciprocating rod extending through the seal 30). The bushing 44 should have a length sufficient to minimize deflection of a cable as it passes through the scraper 36.

The scraper 36 is preferably a single brass scraper having a continuous, uniform scraping edge 46. The term "continuous, uniform scraping edge" is defined herein to mean a continuous edge in contrast to the discontinuous scraping edges of the prior art brass scrapers (such as shown in FIG. 1) having a plurality of slits 17 therein to hopefully provide flexibility thereto. The elastomeric ring 40 is of sufficient size and resilient characteristics as to allow at least the normal amount of deflection of the scraper 36 to be repeatedly accommodated after which the scraper returns to its original position as shown in FIG. 2 without loss of the scraping function. The elastomeric ring 40 preferably has a hardness in the range of 40 to 80 IRHD.

The polytetrafluoroethylene sealing element 38 is preferably held in place solely by mechanical locking between the shell 32 and the scraper 36, although other means can be used, if desired. The sealing element includes a sealing lip 42 which is formed after the molding process (described below with respect to FIGS. 3, 4 and 5) by a slight shrinkage of the polytetrafluoroethylene sealing element when it is removed from the mold.

Figure 3:
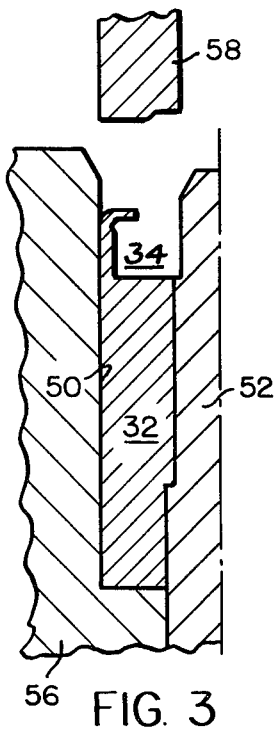
FIGS. 3–5 are partial cross-sectional views through a mold showing in sequential steps the molding method of the present invention for producing the seal of FIG. 2.
Figure 4:
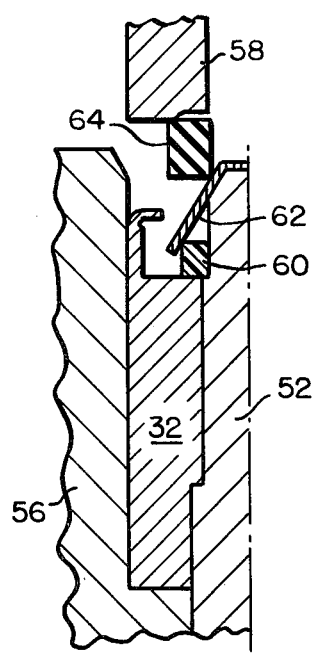
Figure 5:
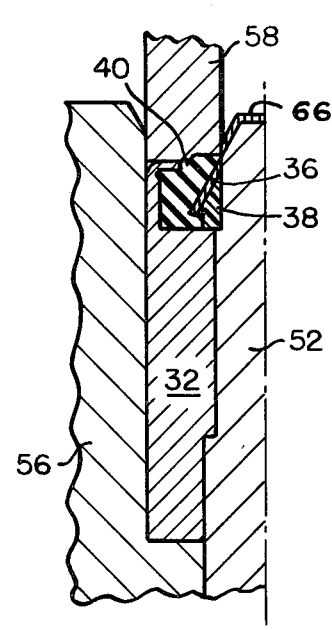

FIGS. 3, 4 and 5 show a molding process for producing the seal 30 shown in FIG. 2, including the steps of placing the shell 32 in a mold cavity 50 defined by a core 52, a center ring 56, and an upper member 58. The upper member 58 is forced downwardly by a press during the molding process as will be well understood by those skilled in the art. After the shell 32 is placed in the cavity 50, a polytetrafluoroethylene ring 60 is placed in the recess 34, then a brass scraper member 62, preferably in the shape of a cup, is placed upside-down on top of the polytetrafluoroethylene ring 60 and the core 52, and then a blank prep form 64 of elastomeric material is placed on top of the brass scraper member 62. Upon closing the mold, the upper member 58 moves downwardly causing the blank prep form 64 to flow into the recess 34 forming the elastomeric ring 40 of FIG. 2, and also pushing the brass member 62 against the polytetrafluoroethylene ring causing the polytetrafluoroethylene ring to be formed into the sealing element 38 shown in FIG. 2. At the same time, the scraper 36 is pinched off or pierced between the mating I.D. surface of the upper member 58 and the O.D. surface of the core 52, thus producing the scraping edge 46 thereof. Also at the same time, the elastomeric ring 40 is bonded to the shell 32 and to the scraper 36. After the completely bonded seal 30 is removed from the mold, the polytetrafluoroethylene sealing element 38 cools and shrinks a small amount causing the formation of the sealing lip 42 thereof. The left-over central portion 66 of the cup-shaped member 62 is not a part of the finished seal 30.

As discussed above, the resultant seal 30 of the present invention is a significant improvement over the prior art since the scraper 36 has no slits to allow contaminants to enter, the resilient back-up ring 40 allows repeated deflection and return of the scraper thus eliminating permanent deformation thereof and the consequent entering of contaminants into the application, the piercing step during molding provides a scraping edge 46 of improved concentricity while eliminating a separate piercing step, and the bonded construction eliminates a leakage path around the outside of the scraper inside the shell. Further, the bushing 44 holds the shaft in near perfect alignment.

While the present invention has been described with reference to FIG. 2 showing the combination of a seal, scraper, and elastomeric ring, it is to be noted that the combination of the scraper 36 and back-up resilient ring 40 can be used alone without the sealing element 38, if desired. In such case the scraper preferably has a continuous, uniform scraping edge without slits and the ring 40 is preferably bonded to the scraper 36. Such combination of the scraper 36 and ring 40 is preferably constructed by molding with the scraping edge 46 being pierced simultaneously with the ring 40 being molded and bonded to the scraper, as shown in FIG. 2. The sealing element 38 and the bushing 44 are not necessary to this deflectable scraper and method aspect of this invention.

It is noted that the preferred material for the scraper material is brass, however, other materials and other metals can be used. The brass material is readily pierced by presently used molds and presses. The seal and scraper of this invention are useful with all shafts including "reciprocating shafts", which term is hereby defined for use in the present specification and claims as including control cables, rods, etc.

The invention has been described in detail with particular reference to the preferred embodiments thereof, but it will be understood that variations and modifications can be effected within the spirit and scope of the invention as described hereinabove and as defined in the appended claims.

What is claimed is:

1. An annular shaft seal and scraper having a bore extending therethrough adapted to receive a shaft and comprising:
    (a) an annular metal shell having an annular recess in the I.D. thereof adjacent one axial end of said shell;
    (b) an annular plastic sealing element positioned in said recess and having a radially inwardly extending sealing lip adapted to contact a shaft extending through said bore of said shaft seal and scraper;
    (c) a single, annular, frusto-conical metal scraper positioned in said recess and having an annular continuous scraping edge adapted to contact a shaft extending through said bore of said shaft seal and scraper, said scraper having a radially inner surface and a radially outer surface and said scraper tapering axially outwardly and radially inwardly such that said radially inner surface is also an axially inner surface and said radially outer surface is also an axially outer surface and wherein said sealing element is positioned axially inside of and in contact with said radially inner surface; and
    (d) an annular, resilient molded elastomeric ring positioned in said recess and positioned substantially radially outwardly of said scraper and being bonded to substantially all of said radially outer surface of said scraper substantially all of the way down to said scraping edge for providing a resilient backing for said scraper for allowing deflection and return thereof, said ring also being bonded to said shell, and wherein said sealing element is mechanically held in place between said scraper and said shell.

2. The seal according to claim 1 wherein said sealing element is polytetraflurorethylene.

3. The seal according to claim 2 wherein said sealing lip of said polytetrafluoroethylene sealing element is closely adjacent said scraper.

4. The seal according to claim 3 including an annular bushing press-fitted in a cylindrical I.D. of said shell adjacent said recess and having a length sufficient to limit the amount of deflection of a shaft extending through said seal.

5. The seal according to claim 4 wherein said scraper has a, uniform scraping edge, and wherein said ring has a hardness in the range of from about 40–80 IRHD.

6. The seal according to claim 5 wherein said scraper is brass.

7. The seal according to claim 1 including an annular bushing press-fitted in a cylindrical I.D. of said shell adjacent said recess and having a length sufficient to limit the amount of deflection of a shaft extending through said seal.

8. The seal according to claim 1 said sealing element having a cylindrical radial inside surface having said radially inwardly extending sealing lip adjacent said scraper and separated therefrom.

9. An annular scraper having a bore extending therethrough and adapted to receive a shaft and comprising:
 (a) an annular metal shell having an annular recess in the I.D. thereof adjacent one axial end of said shell;
 (b) a single, annular frusto-conical metal scraper positioned in said recess, said scraper having a radially inner surface and a radially outer surface and said scraper tapering axially outwardly and radially inwardly such that said radially inner surface is also an axially inner surface and said radially outer surface is also an axially outer surface and having an annular continuous scraping edge adapted to contact a shaft extending through said bore of said scraper, and
 (c) an annular, resilient, molded, elastomeric ring positioned in said recess and in contact with said scraper substantially radially outwardly thereof, and being bonded to said shell and to substantially all of the radially outer surface of said scraper substantially all of the way down to said scraping edge, said elastomeric ring having sufficient resilience to allow repeated deflection and return of said scraper.

10. The scraper according to claim 9 wherein said scraper is made of brass.

11. The scraper according to claim 10 wherein said ring has a hardness in the range of from about 40-80 IRHD.

12. The scraper according to claim 9 including a bushing press-fitted into a cylindrical I.D. of said shell adjacent said recess for maintaining alignment of a shaft passing through said scraper.

13. An apparatus comprising:
 (a) an annular shaft seal and scraper having a bore extending therethrough adapted to receive a shaft,
 (b) a shaft extending through said bore, and
 (c) said shaft seal and scraper comprising:
  (i) an annular metal shell having an annular recess in the I.D. thereof adjacent one axial end of said shell;
  (ii) an annular plastic sealing element positioned in said recess and having a radially inwardly extending sealing lip in contact with said shaft extending through said bore of said shaft seal and scraper;
  (iii) a single, annular, frusto-conical scraper positioned in said recess and having an annular continuous scraping edge in contact with said shaft extending through said bore of said shaft seal and scraper, said scraper having a radially inner surface and a radially outer surface and said scraper tapering axially outwardly and radially inwardly such that said radially inner surface is also an axially inner surface and said radially outer surface is also an axially outer surface and wherein said sealing element is positioned axially inside of and in contact with said radially inner surface; and
  (iv) an annular, resilient molded elastomeric ring positioned in said recess and positioned substantially radially outwardly of said scraper and being bonded to substantially all of said radially outer surface of said scraper substantially all of the way down to said scraping edge for providing a resilient backing for said scraper for allowing deflection and return thereof, said ring also being bonded to said shell, and wherein said sealing element is mechanically held in place between said scraper and said shell.

14. The apparatus according to claim 13 wherein said sealing element is polytetrafluoroethylene.

15. The apparatus according to claim 14 wherein said sealing lip of said polytetrafluoroethylene sealing element is closely adjacent said scraper.

16. The apparatus according to claim 15 including an annular bushing press-fitted in a cylindrical I.D. of said shell adjacent said recess and having a length sufficient to limit the amount of deflection of said shaft extending through said seal.

17. The appartus according to claim 16 wherein said scraper has a uniform scraping edge, and wherein said ring has a hardness in the range of from about 40-80 I.R.H.D.

18. The apparatus according to claim 17 wherein said scraper is brass.

19. The apparatus according to claim 13 including an annular bushing press-fitted in a cylindrical I.D. of said shell adjacent said recess and having a length sufficient to limit the amount of deflection of said shaft extending through said seal.

20. An apparatus comprising:
 (a) an annular scraper having a bore extending therethrough and adapted to receive a shaft;
 (b) a shaft extending through said bore, and
 (c) said scraper comprising:
  (i) an annular metal shell having an annular recess in the I.D. thereof adjacent one axial end of said shell;
  (ii) a single, annular, frusto-conical metal scraper positioned in said recess, said scraper having a radially inner surface and a radially outer surface and said scraper tapering axially outwardly and radially inwardly such that said radially inner surface is also an axially inner surface and said radially outer surface is also an axially outer surface and having an annular continuous scraping edge in contact with said shaft extending through said bore of said scraper, and
  (iii) an annular resilient molded, elastomeric ring positioned in said recess and in contact with said scraper substantially radially outwardly thereof, and being bonded to said shell and to substantially all of the radially outer surface of said scraper substantially all of the way down to said scraping edge, said elastomeric ring having sufficient resilience to allow repeated deflection and return of said scraper.

21. The apparatus according to claim 20 wherein said scraper is made of brass.

22. The apparatus according to claim 21 wherein said ring has a hardness in the range of from about 40-80 IRHD.

23. The apparatus according to claim 22 including a bushing press-fitted into a cylindrical I.D. of said shell adjacent said recess for maintaining alignment of said shaft.

24. The apparatus according to claim 20 including a bushing press-fitted into a cylindrical I.D. of said shell adjacent said recess of maintaining alignment of said shaft.

* * * * *

UNITED STATES PATENT AND TRADEMARK OFFICE
CERTIFICATE OF CORRECTION

PATENT NO. : 4,168,837

DATED : September 25, 1979

INVENTOR(S) : Martin E. Benjamin, George Fedorovich and Dennis N. Denton

It is certified that error appears in the above-identified patent and that said Letters Patent are hereby corrected as shown below:

Claim 24, line 3, delete "of", first occurrence, and insert therefor --for--.

Signed and Sealed this

Eighteenth Day of December 1979

[SEAL]

Attest:

Attesting Officer

SIDNEY A. DIAMOND

Commissioner of Patents and Trademarks